United States Patent
Bethscheider et al.

(10) Patent No.: US 6,275,678 B1
(45) Date of Patent: Aug. 14, 2001

(54) METHOD AND APPARATUS FOR DETERMINING AN OPERATING POINT OF A NON-LINEAR AMPLIFIER OF A COMMUNICATION CHANNEL

(75) Inventors: Gerhard Bethscheider, Ayl (DE); Guy Harles, Howald (LU)

(73) Assignee: Societe Europeenne des Satellites S.A. (LU)

( * ) Notice: Subject to any disclaimer, the term of this patent is extended or adjusted under 35 U.S.C. 154(b) by 0 days.

(21) Appl. No.: 09/213,557

(22) Filed: Dec. 17, 1998

(30) Foreign Application Priority Data

Dec. 18, 1997 (EP) .................................................. 97122420

(51) Int. Cl.$^7$ ....................................................... H04B 7/15
(52) U.S. Cl. ........................... 455/17; 455/334; 455/341; 330/2; 330/10; 375/367
(58) Field of Search ................................ 455/17, 18, 341, 455/334, 293, 427, 434, 12.1; 330/2, 250, 252, 265, 271, 282, 280, 84, 85, 227, 10; 375/318, 350, 358, 367

(56) References Cited

U.S. PATENT DOCUMENTS

| 4,168,398 | * | 9/1979 | Matsuo et al. ................ 178/69.1 |
| 4,637,017 |   | 1/1987 | Assal et al. .................... 370/104 |
| 4,896,369 |   | 1/1990 | Adams, Jr. et al. . |
| 5,204,898 | * | 4/1993 | Leduc .............................. 380/14 |
| 5,455,960 | * | 10/1995 | Pelchat et al. ................ 455/12.1 |
| 5,568,407 | * | 10/1996 | Hass et al. ...................... 364/579 |
| 5,623,227 | * | 4/1997 | Everline et al. ................ 330/2 |
| 5,635,870 | * | 6/1997 | David .............................. 330/52 |
| 5,720,039 | * | 2/1998 | Lieberman ...................... 455/10 |
| 5,731,993 | * | 3/1998 | Wachs et al. .................... 364/553 |
| 5,732,334 | * | 3/1998 | Miyake .......................... 455/126 |
| 5,926,753 | * | 7/1999 | Kobayashi ...................... 455/406 |
| 5,940,025 | * | 8/1999 | Koehnke et al. ................ 342/159 |
| 5,987,304 | * | 11/1999 | Iatt ................................. 455/17 |

FOREIGN PATENT DOCUMENTS

| 3333418 | 4/1985 | (DE) . |
| 03139027 | 6/1991 | (JP) . |

* cited by examiner

*Primary Examiner*—William Trost
*Assistant Examiner*—Congvan Tran
(74) *Attorney, Agent, or Firm*—Wolf, Greenfield & Sacks, P.C.

(57) ABSTRACT

For determining the operating point of a non-linear amplifier 2 of a communication channel 1, for example of a transponder in a communication satellite, a first input signal $I_1$ is transmitted through the communication channel 1 at a power level $P_{I1}$ which drives the non-linear amplifier 2 in a non-linear operation mode. In addition, a second input signal $i_2$ is transmitted through the communication channel 1 simultaneously with the first input signal $I_1$. The second input signal $i_2$ is transmitted at a level below the level of the first input signal $I_1$. If the contribution of the second input signal $i_2$ to the total input of the non-linear amplifier is small, the operating point of the non-linear amplifier is determined almost only by the first input signal. Therefore, the output power $P_{o2}$ corresponding to the second signal $i_2$ is determined most strongly by the input power $P_{I1}$ of the first signal $I_1$. The operating point $(I_f, P_0)$ of said non-linear amplifier (2) is determined ont he basis of an output signal ($o_2$) of said communication channle (1) corresponding to said second signal ($i_2$)

40 Claims, 5 Drawing Sheets

METHOD AND APPARATUS FOR DETERMINING AN OPERATING POINT OF A NON-LINEAR AMPLIFIER OF A COMMUNICATION CHANNEL

This invention relates to a method and an apparatus for determining an operating point of a non-linear amplifier of a communication channel, especially a transponder in a communication satellite under load.

In high frequency communication channels, a non-linear high power amplifier must often be driven at its saturation point in order to obtain the maximum possible output. For example in a satellite, but without limiting the invention to this application, a signal from an uplink station on the ground is received by an antenna, converted in frequency, filtered in an input multiplexer, and amplified by a driver limiter amplifier and a high power amplifier before being filtered in the output multiplexer and retransmitted to the ground. In order to provide a sufficient signal everywhere within the satellite footprint, the high power amplifier must be driven in its saturation point, i.e. the point of maximum in the non-linear transfer curve representing output power vs. input power, as for example shown in FIG. 6a.

The driver limiter amplifier (DLA) is a preamplifier and can be set to run in one of two modes. In linear mode, it acts as a simple linear amplifier. In limiting mode, it provides the function of an automatic level control (ALC). The DLA is normally operated in limiting mode in order to compensate short term level variations due to weather influences. In limiting mode, the DLA shall always provide the same output power to the high power amplifier (HPA), such that the HPA is permanently operated in saturation. Even if the DLA is able to maintain the HPA in saturation if the power received from the uplink ground station is below specification, it is very important that the uplink ground station power is kept on a high level since if the DLA has to compensate for uplink power, the overall signal to noise ratio (SNR) is decreasing, as this is mainly driven by the SNR in the earliest stage of the signal path which is the uplink path in this case.

From the point of view of a satellite operator, it is important to know that the HPA is always operated in saturation and that the signal power from the uplink station is high enough in level at the satellite. Thus the satellite operator is forced to monitor regularly the power flux density as received at the satellite transponder input. The aim is that the video signal from the uplink station is strong enough so that under clear weather conditions, the HPA on board of the satellite is driven in saturation with the DLA in linear mode. This criterion must also be met if the HPA transfer curve has changed due to aging.

Since the uplink power is not accurately known (for instance if the uplink is not done from a site belonging to the satellite operator itself), the operating point of the high power amplifier cannot be determined only from monitoring the downlink power. On one hand this is due to the fact that close to saturation, the input power may vary by a few dB, while the output power will only vary at most a few tenth of dB. On the other hand, if a certain amount of downlink power is measured, it cannot be determined whether the HPA is operated below or above saturation because the transfer curve is ambiguous in output power.

In order to be able to monitor the total received signal power at the HPA input, many satellites are equipped with a power monitoring system. This data can be sent together with telemetry data to the satellite operator. Apart from not all satellites being necessarily equipped with a power monitoring system, the drawback of this method is that if such a system exists in the satellite the related data consumes a certain amount of the telemetry data stream from the satellite to the operator's ground station, which could be used for other vital data. Further, the bitrate of the telemetry data stream may contain a maximum of a few kbit/s. Therefore, even if the satellite is equipped with a power monitoring system, it is also preferable to perform measurements from a ground station instead of onboard the satellite, for many reasons (i.e. failure, weight of the satellite etc.).

In addition to measuring the received power at the satellite, a satellite operator is performing regularly 'In Orbit Tests' (IOT) in order to measure the power flux density required to drive the HPA in saturation.

A first conventional method, as decribed in International Journal of Satellite Communications, Special issue on In-orbit Testing of Communications Satellites, Volume 13, Number 5, Wiley 1995 or in DE-C-33 33 418, is known as AM nulling according to which an amplitude modulated (AM) signal in the uplink is used which is swept in power until the amplitude modulation disappears completely. This point is exactly at saturation. A second conventional method of determining the transfer curve of the HPA consists of measuring transmit and receive power of a clean carrier, where all path attenuations have to be cancelled out. Both IOT measurement methods require that the transponder under test is not operated. In other words, the payload signal has to be switched off during the tests.

The necessity of switching off the payload signal during in orbit tests represents a considerable drawback not only for the user of the transponder, since communication is interrupted, but also for the operator of the satellite since the tests have to be performed in an expedited manner to keep the interruption as short as possible. In some cases it is impossible to interrupt communications via the communication channel so that the conventional methods cannot be used for testing the HPA after the satellite has entered in operation.

It is an object of the present invention to provide a method and an apparatus for determining an operating point of a non-linear amplifier of a communication channel.

It is a further object of the invention to provide such a method and such an apparatus avoiding the necessity to interrupt traffic via the communication channel.

These objects and other objects are achieved by a method for determining the operating point of a non-linear amplifier of a communication channel, wherein a first signal is transmitted simultaneously with a second signal through said communication channel and said operating point of said non-linear amplifier is determined on the basis of an output signal of said communication channel corresponding to said second signal, the input power of said first signal being such that said non-linear amplifier is operated in a non-linear mode and the input power of said second signal being below the input power of said first signal.

Preferably, the level of said second signal is approx. 20 dB or more below the level of said first signal.

In a preferred embodiment, said second signal is a pseudo noise modulated clean carrier signal and said output signal of said communication channel (1) corresponding to said second signal is a recovered carrier signal.

In another preferred embodiment, said second signal is a clean carrier signal and wherein said output signal of said communication channel corresponding to said second signal is a narrowband filtered carrier signal.

Advantageously, reference values are used together with said output signal of said communication channel corresponding to said second signal to determine the operating point of said non-linear amplifier.

These reference values can be pre-recorded for said non-linear amplifier and correspond to a transfer curve of said non-linear amplifier.

The above objects and other objects are also achieved by an apparatus for determining the operating point of a non-linear amplifier of a communication channel comprising means for transmitting a second signal through said communication channel simultaneously with a first signal being transmitted through said communication channel and means for determining said operating point of said non-linear amplifier on the basis of an output signal of said communication channel corresponding to said second signal, the input power of said first signal being such that said non-linear amplifier is operated in a non-linear mode and the input power of said second signal being below the input power of said first signal.

In a preferred embodiment, said means for determining said operating point of said non-linear amplifier on the basis of an output signal of said communication channel corresponding to said second signal comprise means for storing reference values to be used together with said output signal of said communication channel corresponding to said second signal to determine the operating point of said non-linear amplifier.

In summary, for determining the operating point of a non-linear amplifier of a communication channel, for example of a transponder in a communication satellite, a first input signal is transmitted through the communication channel at a power level which drives the non-linear amplifier in a non-linear operation mode. In addition, a second input signal is transmitted through the communication channel simultaneously with the first input signal. The second input signal is transmitted at a level below the level of the first input signal. If the contribution of the second input signal to the total input of the non-linear amplifier is small, the operating point of the non-linear amplifier is determined almost only by the first input signal. Therefore, the output power corresponding to the second signal is determined most strongly by the input power of the first signal. The operating point of said non-linear amplifier is determined on the basis of an output signal of said communication channel corresponding to said second signal.

To achieve the above objects and other objects the invention further provides a method for determining the operating point of a non-linear amplifier of a communication channel through which a payload signal is transmitted at a predetermined level, comprising: generating a first pseudo noise signal PN(t); modulating a clean carrier signal f(t) with said first pseudo noise signal PN(t) to generate a PN modulated clean carrier signal s(t); transmitting said PN modulated clean carrier signal s(t) simultaneously with said payload signal through said communication channel at a level below the level of said payload signal; receiving a receive signal s'(t) corresponding to said PN modulated clean carrier signal s(t) after having traveled through said communication channel; correlating said receive signal s'(t) with said first pseudo noise signal PN(t) to generate a recovered carrier signal f'(t); and determining the operating point of said non-linear amplifier of the communication channel on the basis of said clean carrier signal f(t) and said recovered carrier signal f'(t).

Advantageously, the level of said PN modulated clean carrier signal s(t) is approx. 20 dB or even approx. 30 dB or more below the level of said payload signal.

According to the invention, said first pseudo noise signal PN(t) is a binary pseudo noise sequence, said binary pseudo noise sequence being generated by means of a feed back shift register or a memory device in which a sequence of values of a pseudo noise signal is stored.

Said correlating of said receive signal s'(t) and said first pseudo noise signal PN(t) can be achieved by delaying said first pseudo noise signal PN(t) and multiplying the delayed first pseudo noise signal PN(t) and said receive signal s'(t).

In a preferred embodiment, a gain is determined on the basis of said clean carrier signal f(t) and said recovered carrier signal f'(t) and said gain is used to determine the input power of said payload signal. Reference values are used to derive from said gain the input power of said payload signal, said reference values having been pre-recorded for said non-linear amplifier and representing a gain curve or transfer curve of said non-linear amplifier over the input power of said payload signal.

The method according to the invention is advantageously applicable if said communication channel is a transponder of a communication satellite.

To achieve the above objects and other objects the invention furthermore provides an apparatus for determining the operating point of a non-linear amplifier of a communication channel through which a payload signal is transmitted at a predetermined level, comprising first pseudo noise signal generating means for generating a pseudo noise signal PN(t); first modulating means for modulating a clean carrier signal f(t) with said first pseudo noise signal PN(t) to generate a PN modulated clean carrier signal s(t); transmitting means for transmitting said PN modulated clean carrier signal s(t) simultaneously with said payload signal through said communication channel at a level below the level of said payload signal; receiving means for receiving a receive signal s'(t) corresponding to said PN modulated clean carrier signal s(t) after having traveled through said communication channel; and first correlating means for correlating said receive signal s'(t) with said pseudo noise signal PN(t) to generate a recovered carrier signal f'(t).

Advantageously, the level of said PN modulated clean carrier signal s(t) is at least 20 dB or even at least 30 dB below the level of said payload signal.

According to the invention, said first pseudo noise signal generating means (9) is a feed back shift register or a memory device in which a sequence of values of a pseudo noise signal is stored.

In summary, for determining the operating point of a non-linear amplifier of a communication channel, for example of a transponder in a communication satellite, a clean carrier signal f(t) is modulated with a pseudo noise signal PN(t) and transmitted through the communication channel at a level below the level of a payload signal which is transmitted via the communication channel simultaneously. The received signal s'(t) is correlated with the same pseudo noise signal PN(t) to obtain a recovered carrier signal f'(t). The power of the clean carrier signal f(t) and of the recovered carrier signal f'(t) are used to determine the gain of the signal and on the basis of reference values (calibration curves) the input power of the payload signal. Since the PN modulated clean carrier signal s(t) is transmitted at a low level, it is possible to perform measurements without switching off the payload signal, the input power of which defining the operating point of the non-linear amplifier.

An important advantage of the method and the apparatus according to the invention is of course that the payload signal does not have to be switched off for performing the measurements. This limits considerably the downtime required for maintenance and verification of the communication channel, and thus increases availability of services.

In the following an embodiment of the invention will be described in greater detail and with reference to the drawings.

Figure 1:
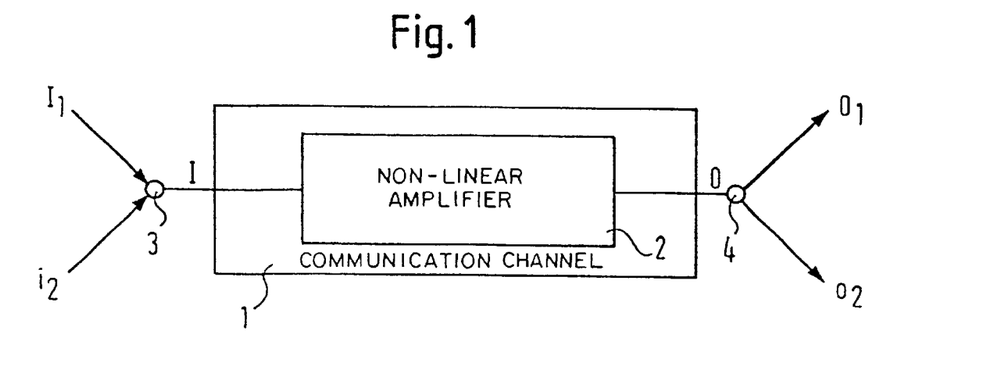
FIG. 1 shows a schematic diagram of a communication channel comprising a non-linear amplifier.

To describe the invention in a more general application, FIG. 1 shows a communication channel 1 comprising a non-linear amplifier 2 for amplifying the signals transmitted through the communication channel. If a total input signal I is fed to an input 3 of the communication channel 1, the signal traveles through the communication channel 1, is amplified by the non-linear amplifier 2, and is output as a total output signal O at an output 4 of the communication channel 1.

Figure 2:
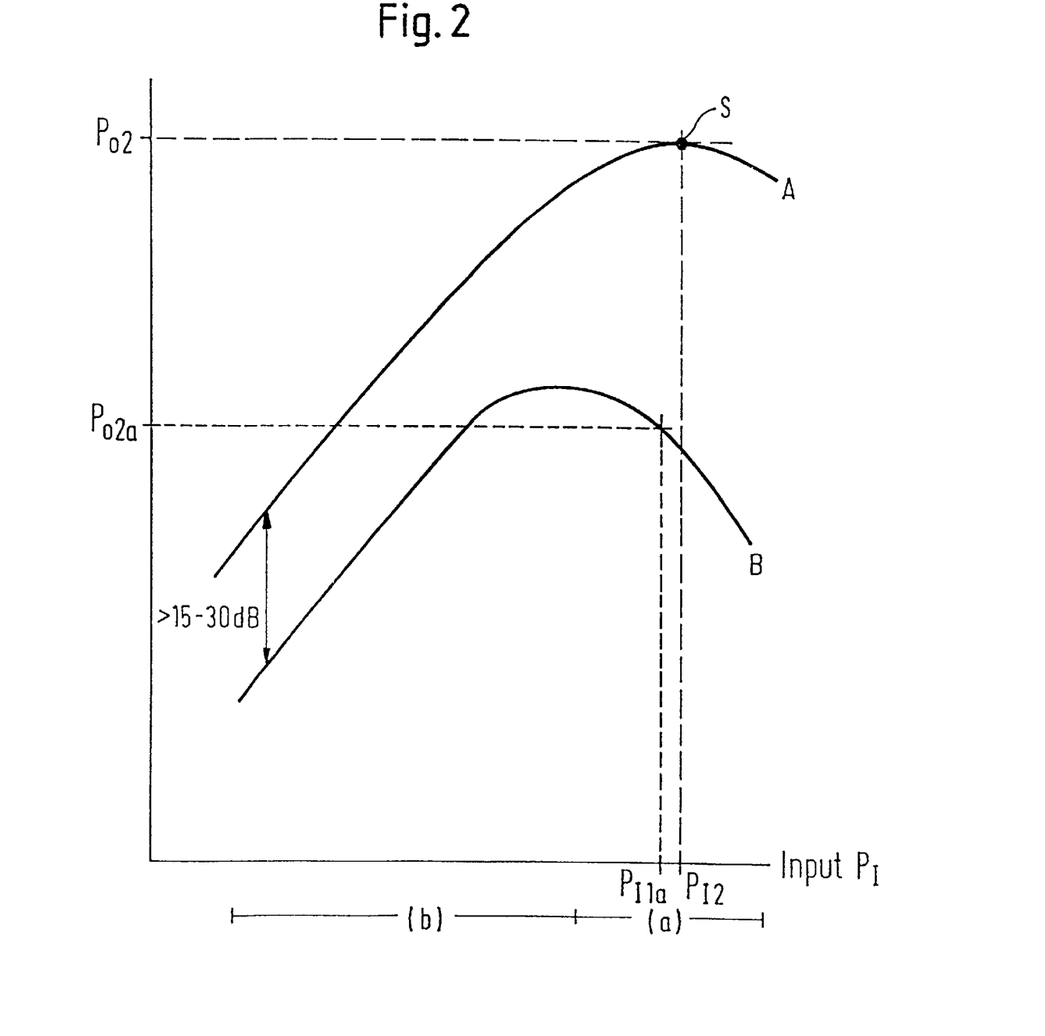
FIG. 2 shows transfer curves of a non-linear amplifier.

As can be seen in FIG. 2, which shows a transfer curve A of a traveling wave tube amplifier (TWTA), as an example of a non-linear amplifier, a non-linear mode of operation is effected if the input power $P_I$ of the total input signal I is high enough to operate the non-linear amplifier in the non-linear region (a) of its transfer curve. In some applications the goal is to drive the non-linear amplifier 2 in its saturation point as indicated by S in FIG. 2 to obtain maximum output power. As in the linear region (b) of the transfer curve, each operating point of the non-linear amplifier in the non-linear region (a) is defined by a specific input power $P_I$ of an input signal I and a corresponding output power $P_o$ of an output signal O of the communication channel. In saturation the input signal provides an input power of $P_{IS}$ corresponding to an output power of $P_{OS}$.

According to the invention, a first input signal $I_1$ is transmitted through the communication channel 1 at a power level $P_{I1}$ which drives the non-linear amplifier 2 in a non-linear operation mode. In addition, a second input signal $i_2$ is transmitted through the communication channel 1 simultaneously with the first input signal $I_1$. The second input signal $i_2$ is transmitted at a level below the level of the first input signal $I_1$. In other words, the input power $P_{I2}$ of the second signal $i_2$ is lower than the input power $P_{I1}$ of the first signal $I_1$. If the contribution of the second input signal $i_2$ to the total input of the non-linear amplifier is small, the operating point of the non-linear amplifier is determined almost only by the first input signal. Therefore, the output power $P_{o2}$ corresponding to the second signal $i_2$ is determined most strongly by the input power $P_{I1}$ of the first signal $I_1$. Thus, any variation in input power of the first signal causes a variation in output power of the second signal. To achieve this effect the second input signal should be some 15 to 30 dB or more, depending on the application, below the first input signal. This is indicated in the linear region (b) in FIG. 2 which shows a transfer curve B representing the output power of a small input signal plotted against the input power of a large input signal.

As also indicated in FIG. 2, in the non-linear region (a) the transfer curve B of the second input signal falls off much faster than the transfer curve of the first input signal so that any variation of the output power of the second input signal caused by a variation of the input power of the first input signal can be measured much easier as long as the part $o_2$ of the output signal O corresponding to the second input signal $i_2$ can be separated from the part $O_1$ of the output signal O corresponding to the first input signal $I_1$, as indicated in FIG. 1.

The separation of the contributions $O_1$ and $o_2$ of the first and second input signals $I_1$ and $i_2$, respectively, in the output signal O may be achieved in several different ways. For example, if the first input signal $I_1$ is a FM or QPSK signal, the second input signal $i_2$ may be a pseudo noise modulated clean carrier signal as will be explained further below in greater detail. By correlating the output signal with the pseudo noise signal used for generating the second input signal $i_2$ the carrier signal can be recovered. The recovered carrier signal represents the output signal $o_2$ corresponding to the second input signal $i_2$. As an alternative, the second input signal could be a clean carrier signal having a frequency which avoids deterioration of the second input signal by the first input signal, for example having a frequency outside the frequency band of the first input signal. By narrowband filtering the output signal O at the frequency of the second input signal the part $o_2$ of the second input signal $i_2$ in the total output signal O can be determined.

According to the invention, the operating point of the non-linear amplifier can be determined in different ways. If the input power of the first and second input signal is known the output power corresponding to these signals can be measured and a transfer curve or a gain curve, an example being shown in FIG. 6b, can be obtained. If the transfer curve or the gain curve is known, the input power of the first input signal driving the non-linear amplifier in a non-linear mode of operation can be determined by transmitting a second input signal of a known input power through the communication channel and measuring the output power corresponding to the second input signal.

It should be noted that in the non-linear mode it is difficult if not impossible to determine the input power of the first signal from the output power of the first input signal, especially if the non-linear amplifier is to be operated in saturation, since even relatively large variations in input power result in only slight variations in output power of the first signal, respectively. Further, an ambiguity exists in the non-linear region around the saturation point S as can be seen in FIG. 2 so that the input power cannot unambiguously be determined if a certain level of output power is measured as two levels of input power correspond thereto.

However, according to the invention, the input power of the first signal and, therefore, the operating point of the non-linear amplifier can be determined on the basis of the input power of the second input signal and the transfer curve or the gain curve (or any other representation of the above described relation between the large and the small input signal), if the second input signal is a small signal compared to the first input signal, as explained above. For example, as shown in FIG. 2, if the output power of the second signal is measured to be $P_{o2a}$ the transfer curve B of the second signal $i_2$ allows to determine the input power of the first signal $I_1$ to be $P_{I1a}$ without measuring the output power of the first signal at all.

Over a long period the transfer curve and the gain curve of the non-linear amplifier may change due to aging. According to the invention, such a change of the transfer curve can be detected by determining the operating point of the non-linear amplifier on the basis of first and second input signals $I_1$ and $i_2$ the individual input powers $P_{I1}$, and $P_{I2}$ of which are known. By measuring the individual output powers $P_{o1}$ and $P_{o2}$ corresponding to the first and second input signal $I_1$ and $i_2$ the operating point can be determined and compared to the operating point derived on the basis of the transfer curve (or any other representation thereof).

Figure 3:
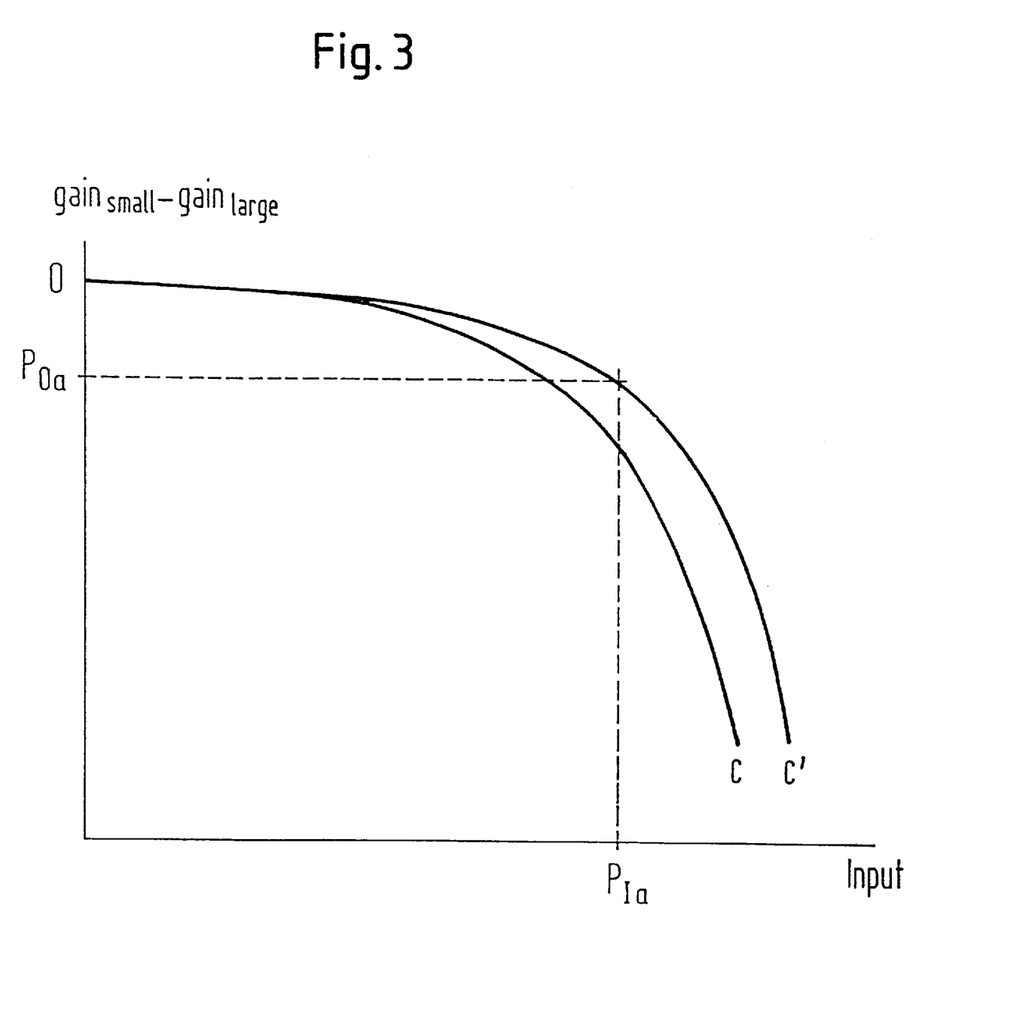
FIG. 3 shows a diagram of gain difference over input power of a non-linear amplifier.

To explain this aspect of the invention in some further detail, FIG. 3 shows a diagram representing a gain difference between the first signal and the second signal, i.e. $gain_{small}$-$gain_{large}$, plotted over the input power of the first signal. If an operating point (PIa, Poa) is determined as described above which is not on the pre-recorded curve C, aging of the non-linear amplifier has caused a shift of the curve, indicated by curve C'. Although not shown in FIG. 2, a similar shift can also be seen in the transfer curve of the non-linear amplifier.

Figure 4:
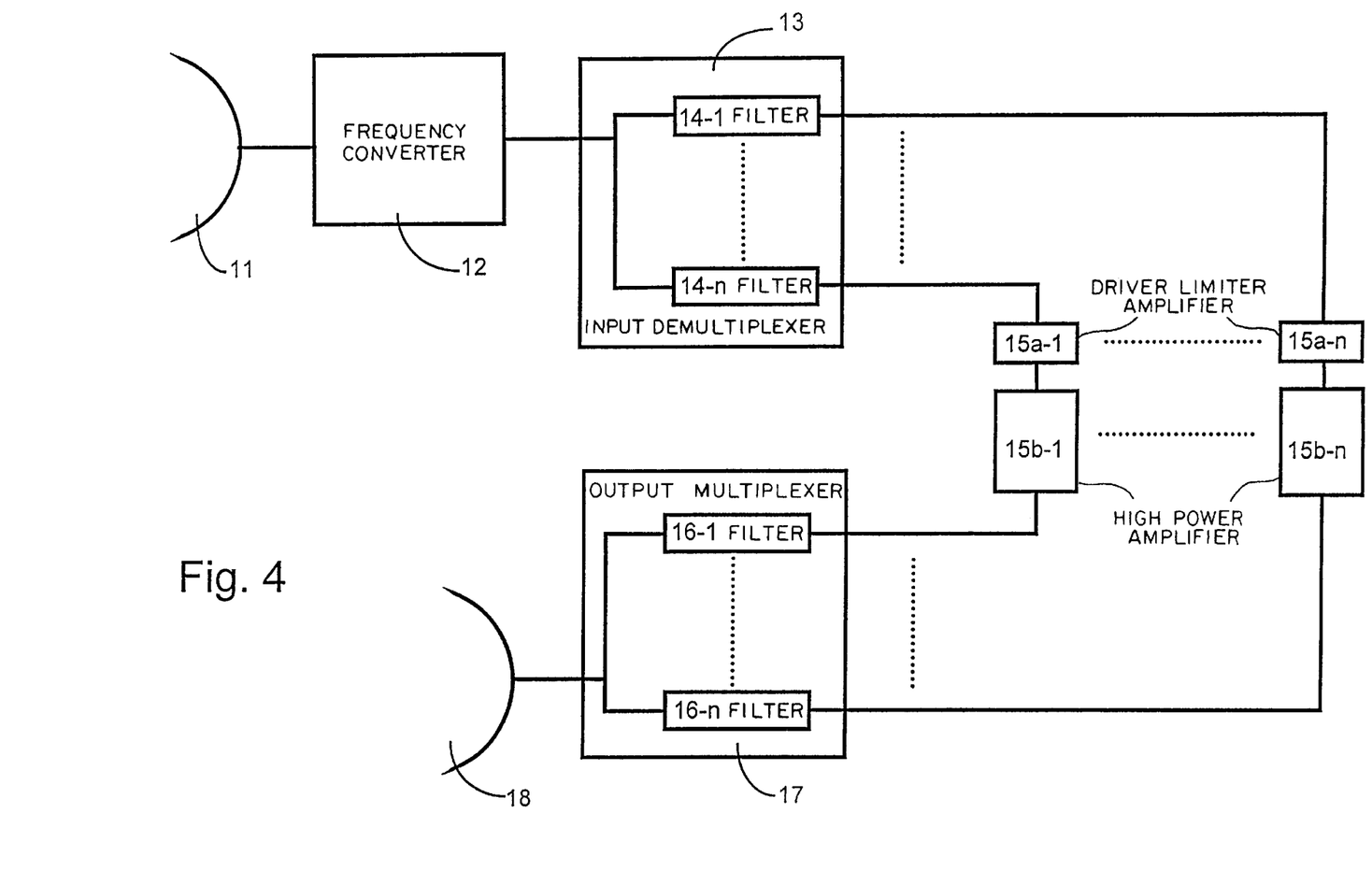
FIG. 4 shows a schematic diagram of a transponder of a communication satellite.

For the purpose of describing a more specific embodiment of the invention, but without limiting the invention to this application, FIG. 4 shows the components of a transponder in a communication satellite as an example for a communication channel.

Figure 6A:
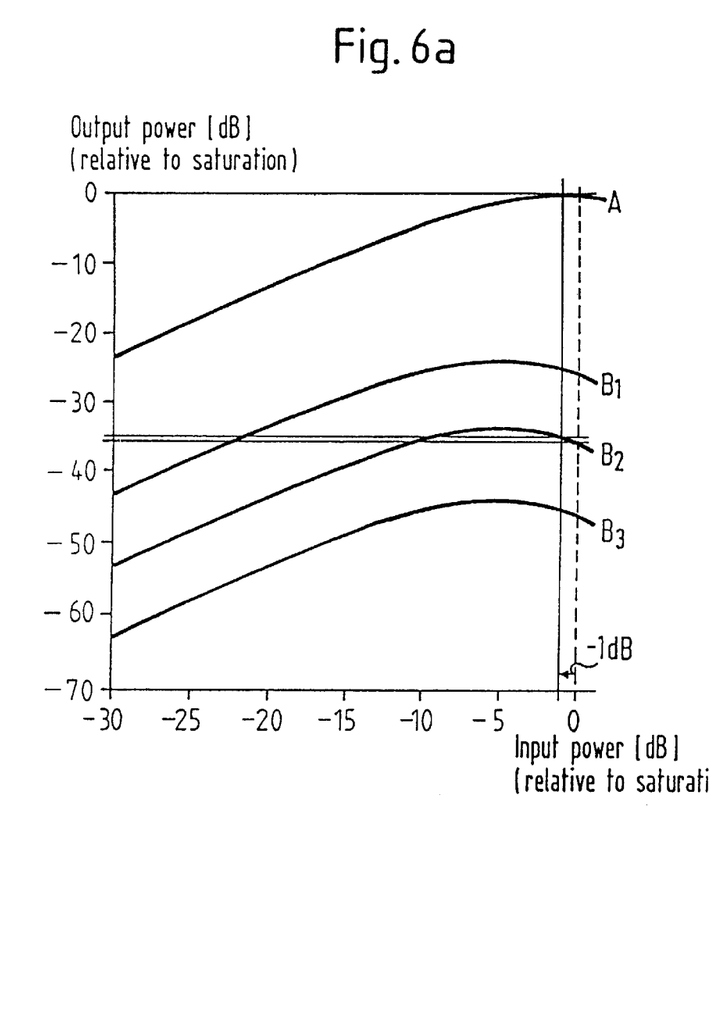
FIGS. 6a and 6b show transfer curves and gain curves of a non-linear amplifier for large and small signals.
Figure 6B:
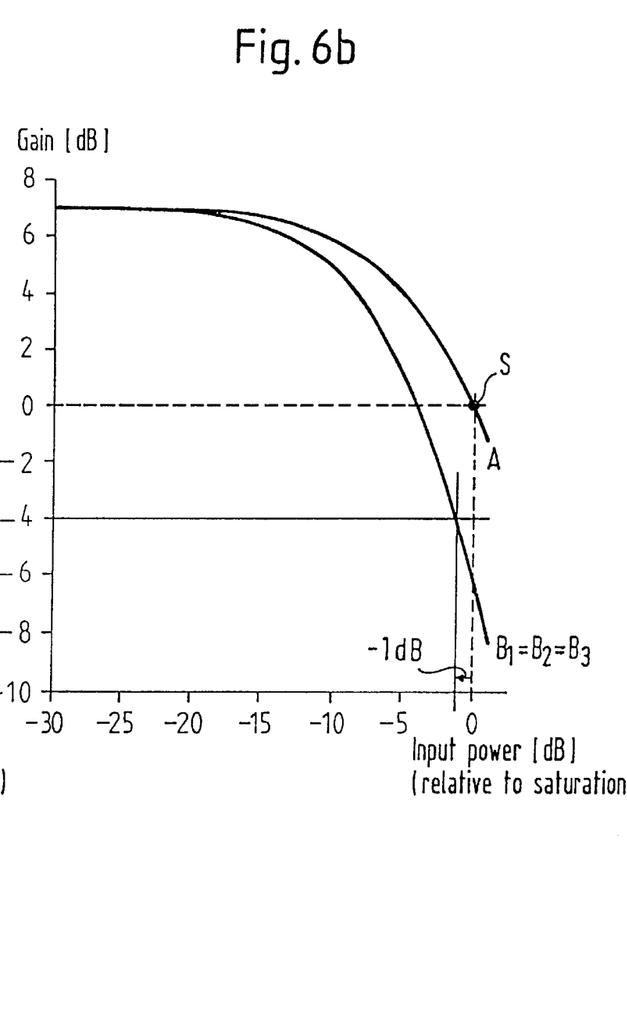

A transponder of a communication satellite comprises a receiving antenna 11 for receiving an uplink signal (=the first input signal) sent from a uplink ground station (not shown). An output signal of said receiving antenna 11 is fed to an input demultiplexer (IMUX) 13 after frequency conversion in frequency converter 12. Said input demultiplexer 13 comprises several first filters 14-1 to 14-$n$ for separating individual signals within the signal from the antenna. Typically, one filter is provided for each signal to be separated from the other signals received via said receiving antenna 1 and corresponds to a communication channel. The n output signals of said input demultiplexer 13 are fed to a corresponding number of driver limiter amplifiers 15$a$-1 to 15$a$-$n$ and high power amplifiers 15$b$-1 to 15$b$-$n$. In each of the high power amplifiers a traveling wave tube (TWT) is employed for amplifying the output signals of said input demultiplexer 13. The high power amplifiers 15$b$-1 to 15$b$-$n$ are non-linear amplifiers having a transfer curve and gain curve as indicated by curves A in FIGS. 6$a$ and 6$b$, respectively. If not set to a linear mode the driver limiter amplifiers 15$a$-1 to 15$a$-$n$ are either limiting or amplifying the input signal received from the input demultiplexer 13 before being fed to the respective high power amplifier. The amplifier output signals are passed through second filters 16-1 to 16-$n$ which are part of an output multiplexer (OMUX) 17 combining the n amplifier output signals. The output signal of said output multiplexer 17 is fed to a transmitting antenna 18 for being transmitted to the desired area on the ground.

The operating point of each of said high power amplifiers 15$b$-1 to 15$b$-$n$ depends on the payload signal (the first input signal) from the uplink ground station, which signal should be such that the amplifier is driven in saturation in order to achieve maximum output power. Within predetermined limitations, the driver limiter amplifiers 15$a$-1 to 15$a$-$n$ can be set such that each of said high power amplifiers is operated in its saturation point. For the measurement described below the driver limiter amplifiers are set to linear operation.

Figure 5:
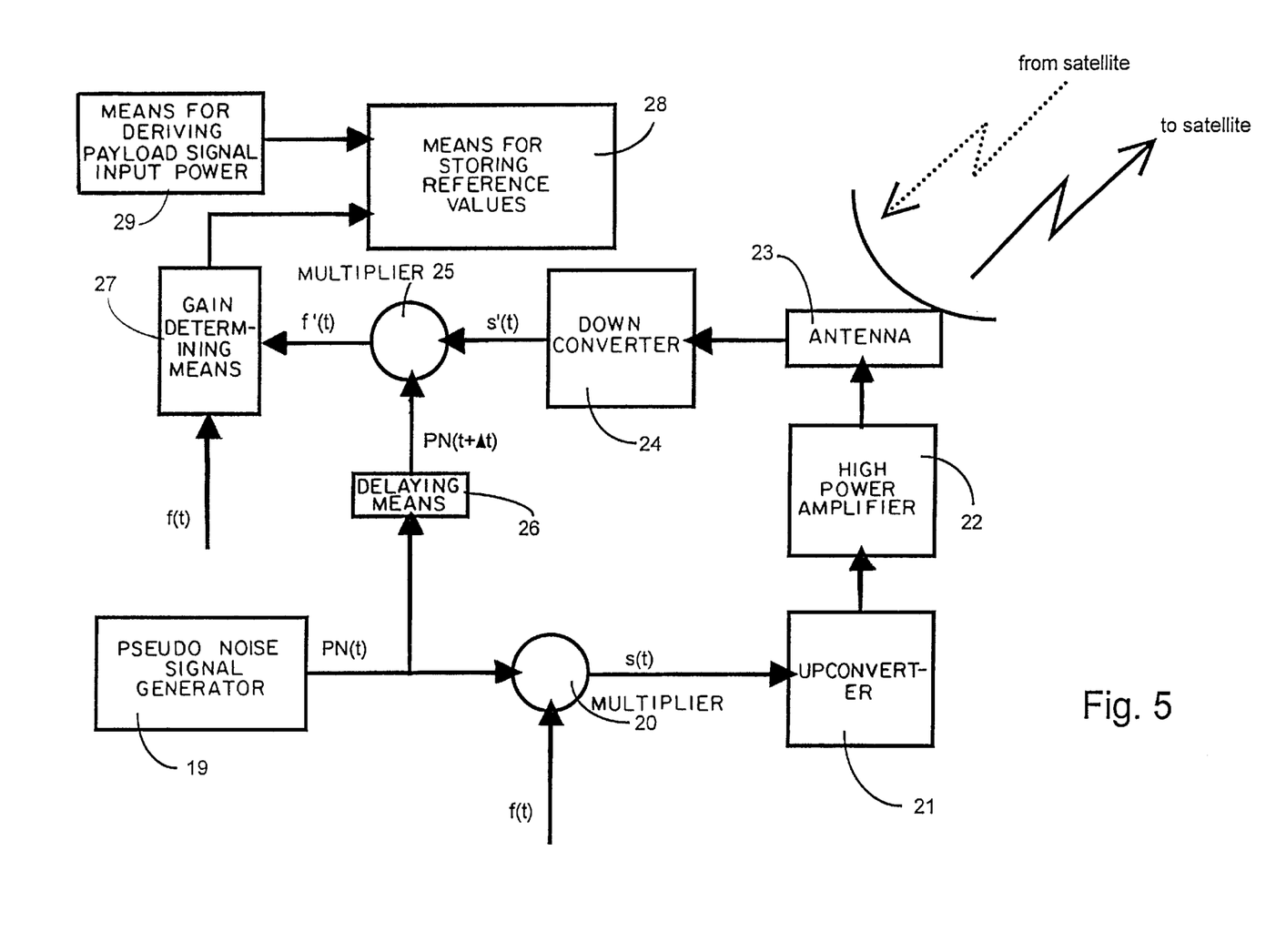
FIG. 5 shows a schematic diagram of an embodiment of an apparatus according to the invention.

According to the invention, in a ground station (10) as shown in FIG. 5, a pseudo noise signal PN(t) is generated by means of a pseudo noise signal generator 19, for example a feed back shift register or a memory device in which a sequence of values of a pseudo noise signal is stored. The pseudo noise signal PN(t) has a very sharp autocorrelation function at zero delay. This allows to determine the time delay between the locally generated pseudo noise signal PN(t) and a received signal which is delayed due to the propagation time. A clean carrier signal f(t) is modulated with said pseudo noise signal PN(t) by means of a first multiplier 20 to form a PN modulated clean carrier signal s(t)=PN(t)×f(t). The PN modulated clean carrier signal s(t) is fed to an upconverter 21 and via a high power amplifier 22 to an antenna 23 which transmits the PN modulated clean carrier signal s(t) (=the second input signal) to the transponder of the communication satellite under test. However, from the viewpoint of a user transmitting a payload signal to the satellite, the transponder remains usable during the test and can be continuously supplied with a payload signal.

According to the invention, the level of the transmitted PN modulated clean carrier signal s(t) is sufficiently below the level of the payload signal, for example about 20 to 30 dB or more, such that the payload signal is not notably deteriorated. For this reason, the PN modulated clean carrier signal s(t) can be transmitted while the communication channel is in use, i.e. simultaneously with a payload signal being transmitted to the transponder of the satellite from the same or from another ground station.

In the embodiment, antenna 23 is also used to receive the signal re-transmitted by the transponder of the satellite, in other words the signal which has traveled through the communication channel. The output signal of antenna 23 is passed through a downconverter 24 to obtain a receive signal s'(t) which is fed to a second multiplier 25 receiving also the same but delayed pseudo noise signal PN(t). The delay is generated by delaying means 26 which are set such that the output of the second multiplier 25 becomes maximum. Thereby, the receive signal s'(t) is multiplied, in other words correlated with the very same pseudo noise signal PN(t) which has been used for generating the PN modulated clean carrier signal s(t) and a recovered carrier signal f'(t) is obtained which is only delayed and attenuated in comparison with the clean carrier signal f(t) The path attenuation is constant as free space loss does practically not vary with the distance between the satellite and the ground station. Since atmosperical attenuation can be measured with radiometers, it can be taken into account as well as the gain of the ground station antenna at the corresponding frequencies. Thus, the input power of the clean carrier signal f(t) and the output power of the recovered carrier signal f'(t) can be measured to determine the gain of this signal. The input power of the payload signal is determined on the basis of said gain and of reference values or calibration curves, which are shown in FIGS. 6$a$ and 6$b$ and which will be explained in greater detail further below.

If for example as shown in FIG. 6$b$ the gain of the small signal is measured to be −4 dB the input power of the large signal is −1 dB. Here it should be noted how powerful this measurement is compared to measuring the output power: while the output power of the large signal changes by less than 0.05 dB for the input power varying from 0 dBW to −1 dB, the gain of the small signal varies by almost 2 dB.

In FIG. 6$a$, transfer curves for a large signal (A) and three small signals ($B_1$, $B_2$, $B_3$) over a traveling wave tube amplifier (TWTA) are shown. For simplicity, the values are given relative to the saturation point of the amplifier. This means that in FIG. 6$a$ 0 dB input power corresponds to 0 dB output power. The three small signals ($B_1$, $B_2$, $B_3$) are 20 dB, 30 dB, and 40 dB below the large signal, respectively. In FIG. 6$b$, gain curves for the large signal (A) and the three small signals ($B_1$, $B_2$, $B_3$) are shown. Again, the values are given relative to the saturation point of the amplifier so that in FIG. 6$b$ 0 dB input power corresponds to 0 dB gain. As the gain of the small signals does not depend on the input power difference relative to the large signal but only on the input power of the large signal, the gain curves for the three small signals overlap completely. The above described transfer curves and gain curves, shown in FIG. 6$a$ and 6$b$, are obtained as calibration curves for each amplifier in the satellite in order to determine the operating point of the individual amplifier later on. Advantageously, the calibration curves are recorded in the form of reference values which are stored in appropriate storage means for being used in determining the operating point of the non-linear amplifier.

For measuring the calibration curves, a large signal and a small signal are generated where the small signal is for example 20 dB, 30 dB, or 40 dB below the large signal. The large and the small signal may be a clean carrier or the large signal may be a FM or OPSK modulated signal to come as close as possible to real operation conditions and the small signal may be a pseudo noise modulated clean carrier signal. Both signals, i.e. the large and the small signal, are combined and transmitted to the transponder. The total input signal received by antenna 11 is fed to the input of the high power amplifier (TWTA). The combined signal is swept in power, thus the level difference between the large signal and the small signal at the input will always remain the same. However, as an alternative, the power of the small signal may be kept constant as it does not substantially influence the operating point of the non-linear amplifier. The output signal of the high power amplifier (TWTA) is fed to antenna 18 via output multiplexer 17 and the output levels corresponding to both input signals are measured separately.

In the calibrating curve as shown in FIG. 6a, the output power of the large signal (which is almost equal to the total output power as the small signal has a negligible contribution) is given as a function of the input power of the large signal. The output power of the small signal is also given as a function of the input power of the large signal. In FIG. 6b, the gain of the large signal and the gain of the small signals are given as a function of the input power of the large signal.

In the ground station shown in FIG. 5, means 27 for determining a gain on the basis of said clean carrier signal f(t) and said recovered carrier signal f'(t) are provided, receiving both the clean carrier signal f(t) and the recovered carrier signal f'(t). Furthermore, means 28 for deriving the input power of said payload signal from reference values and from said gain are provided. The output of said means 27 for determining a gain are supplied to said means 28 for deriving the input power of said payload signal. The reference values are stored in and supplied from means 29 for storing said reference values. The said reference values have been pre-recorded for said non-linear amplifier and represent a gain curve or transfer curve of said non-linear amplifier over the input power of said payload signal, as described with respect to FIGS. 6a and 6b.

Only pseudo noise signals have been discussed above because these signals can be generated comparatively easily. However, true noise signals can be used in the method and the apparatus according to the invention. Properties of true and pseudo noise signals are well known to those skilled in the art and are described, for example in Bernard Sklar, "Digital Communications—Fundamentals and Applications", Prentice Hall, 1988.

What is claimed is:

1. Method for determining an operating point of a non-linear amplifier of a communication channel through which a payload signal is transmitted at a predetermined level, comprising:

generating a first pseudo noise signal PN(t);

modulating a clean carrier signal f(t) with said first pseudo noise signal PN(t) to generate a PN modulated clean carrier signal s(t);

transmitting said PN modulated clean carrier signal s(t) simultaneously with said payload signal through said communication channel at a level below the level of said payload signal;

receiving a receive signal s'(t) corresponding to said PN modulated clean carrier signal s(t) after having traveled through said communication channel;

correlating said receive signal s'(t) with said first pseudo noise signal PN(t) to generate a recovered carrier signal f'(t); and determining the operating point of said non-linear amplifier of the communication channel on the basis of said clean carrier signal f(t) and said recovered carrier signal f'(t);

wherein said correlating of said receive signal s'(t) and said first pseudo noise signal PN(t) is achieved by delaying said first pseudo noise signal PN(t) and multiplying the delayed first pseudo noise signal PN(t) and said receive signal s'(t).

2. Method according to claim 1, wherein the level of said PN modulated clean carrier signal s(t) is approximately 20 dB or more below the level of said payload signal.

3. Method according to claim 1, wherein the level of said PN modulated clean carrier signal s(t) is approximately 30 dB or more below the level of said payload signal.

4. Method according to claim 1, wherein said first pseudo noise-signal PN(t) is a binary pseudo noise sequence.

5. Method according to claim 4, wherein said binary pseudo noise sequence is generated by means of a feed back shift register or a memory device in which a sequence of values of a pseudo noise signal is stored.

6. Method according to claim 1, wherein said first pseudo noise signal PN(t) is a binary pseudo noise sequence.

7. Method according to claim 6, wherein said binary pseudo noise sequence is generated by means of a feed back shift register or a memory device in which a sequence of values of a pseudo noise signal is stored.

8. Method according to claim 1, wherein a gain is determined on the basis of said clean carrier signal f(t) and said recovered carrier signal f'(t) and said gain is used to determine the input power of said payload signal.

9. Method according to claim 8, wherein reference values are used to derive from said gain the input power of said payload signal.

10. Method according to claim 9, wherein said reference values have been pre-recorded for said non-linear amplifier and represent a gain curve or a transfer curve of said non-linear amplifier over the input power of said payload signal.

11. Method according to claim 1, wherein said communication channel is a transponder of a communication satellite.

12. Apparatus for determining an operating point of a non-linear amplifier of a communication channel through which a payload signal is transmitted at a predetermined level, comprising:

first pseudo noise signal generating means for generating a pseudo noise signal PN(t);

first modulating means for modulating a clean carrier signal f(t) with said first pseudo noise signal PN(t) to generate a PN modulated clean carrier signal s(t);

transmitting means for transmitting said PN modulated clean carrier signal s(t) simultaneously with said payload signal through said communication channel at a level below the level of said payload signal;

receiving means for receiving a receive signal s'(t) corresponding to said PN modulated clean carrier signal s(t) after having traveled through said communication channel;

first correlating means for correlating said receive signal s'(t) with said pseudo noise signal PN(t) to generate a recovered carrier signal f'(t); and first delaying means for delaying said first pseudo noise signal PN(t).

13. Apparatus according to claim 12, wherein the level of said PN modulated clean carrier signal s(t) is approximately 20 dB or more below the level of said payload signal.

14. Apparatus according to claim 13, wherein the level of said PN modulated clean carrier signal s(t) is approximately 30 dB or more below the level of said payload signal.

15. Apparatus according to claim 12, wherein said first pseudo noise signal generating means is a feed back shift register or a memory device in which a sequence of values of a pseudo noise signal is stored.

16. Apparatus according to claim 13, wherein said first pseudo noise signal generating means is a feed back shift register or a memory device in which a sequence of values of a pseudo noise signal is stored.

17. Apparatus according to claim 14, wherein said first pseudo noise signal generating means is a feed back shift register or a memory device in which a sequence of values of a pseudo noise signal is stored.

18. Apparatus according to claim 12, further comprising means for determining a gain on the basis of said clean carrier signal f(t) and said recovered carrier signal f'(t).

19. Apparatus according to claim 18, further comprising means for deriving from reference values and from said gain the input power of said payload signal.

20. Apparatus according to claim 19, comprising means for storing said reference values having been prerecorded for said non-linear amplifier and representing a gain curve or transfer curve of said non-linear amplifier over the input power of said payload signal.

21. Method for determining an operating point of a non-linear amplifier of a communication channel through which a payload signal is transmitted at a predetermined level, comprising:

generating a first pseudo noise signal PN(t);

modulating a clean carrier signal f(t) with said first pseudo noise signal PN(t) to generate a PN modulated clean carrier signal s(t);

transmitting said PN modulated clean carrier signal s(t) simultaneously with said payload signal through said communication channel at a level below the level of said payload signal;

receiving a receive signal s'(t) corresponding to said PN modulated clean carrier signal s(t) after having traveled through said communication channel;

correlating said receive signal s'(t) with said first pseudo noise signal PN(t) to generate a recovered carrier signal f'(t); and determining the operating point of said non-linear amplifier of the communication channel on the basis of said clean carrier signal f(t) and said recovered carrier signal f'(t);

wherein a gain variation of said clean carrier signal f(t) and said recovered carrier signal f'(t) is determined in response to a small variation of the input power of said payload signal to determine the absolute input power of said payload signal.

22. Method according to claim 21, wherein the level of said PN modulated clean carrier signal s(t) is approximately 20 dB or more below the level of said payload signal.

23. Method according to claim 21, wherein the level of said PN modulated clean carrier signal s(t) is approximately 30 dB or more below the level of said payload signal.

24. Method according to claim 21, wherein said first pseudo noise signal PN(t) is a binary pseudo noise sequence.

25. Method according to claim 24, wherein said binary pseudo noise sequence is generated by means of a feed back shift register or a memory device in which a sequence of values of a pseudo noise signal is stored.

26. Method according to claim 21, wherein said correlating of said receive signal s'(t) and said first pseudo noise signal PN(t) is achieved by delaying said first pseudo noise signal PN(t) and multiplying the delayed first pseudo noise signal PN(t) and said receive signal s'(t).

27. Method according to claim 26, wherein said first pseudo noise signal PN(t) is a binary pseudo noise sequence.

28. Method according to claim 27, wherein said binary pseudo noise sequence is generated by means of a feed back shift register or a memory device in which a sequence of values of a pseudo noise signal is stored.

29. Method according to claim 28, wherein reference values are used to derive from said gain the input power of said payload signal.

30. Method according to claim 29, wherein said reference values have been pre-recorded for said non-linear amplifier and represent a gain curve or a transfer curve of said non-linear amplifier over the input power of said payload signal.

31. Method according to claim 21, wherein said communication channel is a transponder of a communication satellite.

32. Apparatus for determining an operating point of a non-linear amplifier of a communication channel through which a payload signal is transmitted at a predetermined level, comprising:

first pseudo noise signal generating means for generating a pseudo noise signal PN(t);

first modulating means for modulating a clean carrier signal f(t) with said first pseudo noise signal PN(t) to generate a PN modulated clean carrier signal s(t);

transmitting means for transmitting said PN modulated clean carrier signal s(t) simultaneously with said payload signal through said communication channel at a level below the level of said payload signal;

receiving means for receiving a receive signal s'(t) corresponding to said PN modulated clean carrier signal s(t) after having traveled through said communication channel;

first correlating means for correlating said receive signal s'(t) with said pseudo noise signal PN(t) to generate a recovered carrier signal f'(t); and means for determining a gain variation of said clean carrier signal f(t) and said recovered carrier signal f'(t) in response to a small variation of the input power of said payload signal to determine the absolute input power of said payload signal.

33. Apparatus according to claim 32, wherein the level of said PN modulated clean carrier signal s(t) is approximately 20 dB or more below the level of said payload signal.

34. Apparatus according to claim 33, wherein the level of said PN modulated clean carrier signal s(t) is approximately 30 dB or more below the level of said payload signal.

35. Apparatus according to claim 32, wherein said first pseudo noise signal generating means is a feed back shift register or a memory device in which a sequence of values of a pseudo noise signal is stored.

36. Apparatus according to claim 33, wherein said first pseudo noise signal generating means is a feed back shift register or a memory device in which a sequence of values of a pseudo noise signal is stored.

37. Apparatus according to claim 34, wherein said first pseudo noise signal generating means is a feed back shift register or a memory device in which a sequence of values of a pseudo noise signal is stored.

38. Apparatus according to claim 32, further comprising first delaying means for delaying said first pseudo noise signal PN(t).

39. Apparatus according to claim 32, further comprising means for deriving from reference values and from said gain the input power of said payload signal.

40. Apparatus according to claim 39, comprising means for storing said reference values having been prerecorded for said non-linear amplifier and representing a gain curve or transfer curve of said non-linear amplifier over the input power of said payload signal.

* * * * *